Feb. 13, 1923.
E. E. THOMAS
1,445,111
NUT LOCKING DEVICE
Filed May 2, 1921
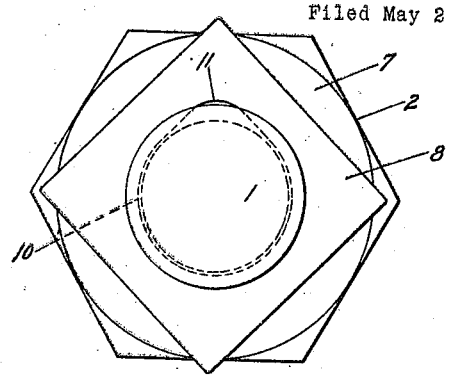
Fig. III
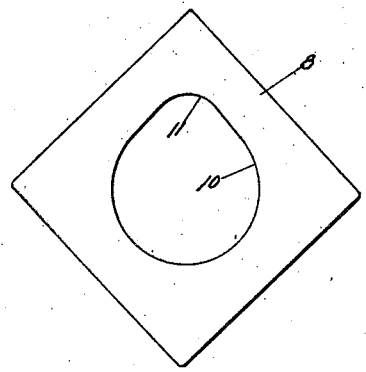
Fig. IV
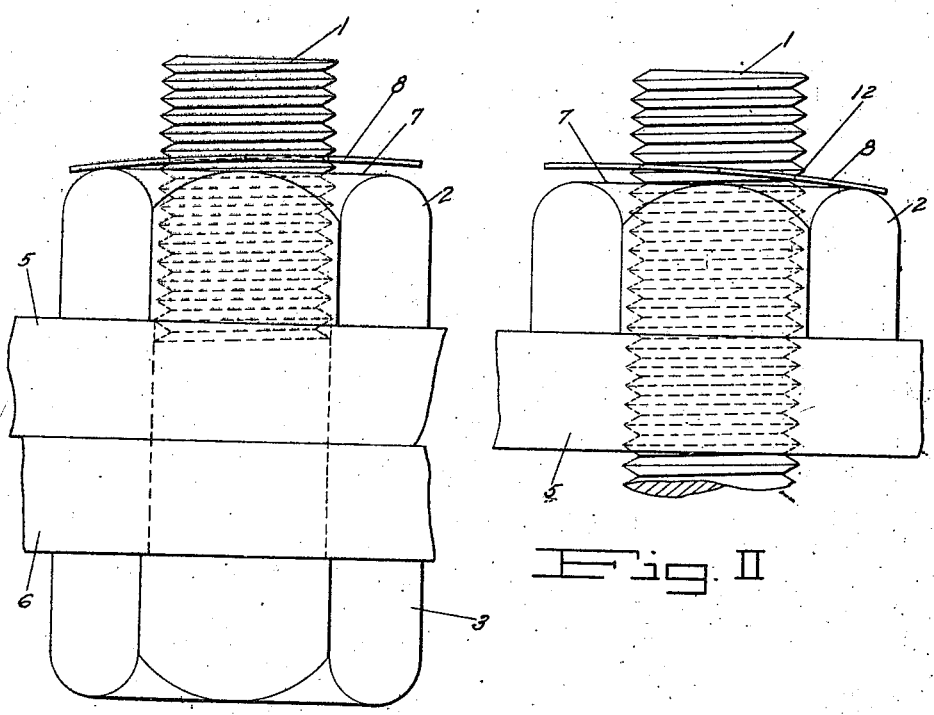
Fig. II
Fig. I
Inventor
Edwin E. Thomas,
By Atkins & Atkins
Attorneys Patented Feb. 13, 1923.

1,445,111

UNITED STATES PATENT OFFICE.

EDWIN E. THOMAS, OF PORTLAND, OREGON, ASSIGNOR TO WILLIAM I. CHIDESTER.

NUT-LOCKING DEVICE.

Application filed May 2, 1921. Serial No. 466,057.

*To all whom it may concern:*

Be it known that I, EDWIN E. THOMAS, a citizen of the United States of America, and resident of Portland, in the county of Multnomah, in the State of Oregon, have invented certain new and useful Improvements in Nut-Locking Devices, of which the following is a specification, reference being had to the accompanying drawing.

My invention relates to means for locking a nut in any position upon a threaded member or bolt, and has for its object the production of a simple, cheap, compact and efficient device of that description and that can be readily applied to and removed from any bolt to whose dimensions it is suited.

What constitutes my invention will be hereinafter specified in detail and succinctly set forth in the appended claim.

In the accompanying drawing,

Figure I is a side elevation of an ordinary bolt and nut, and a pair of objects united by them, and showing also, in edge view, my nut lock applied to the bolt and barely touching the nut on one side.

Figure II is a partial view of the subject matter of Figure I and likewise in elevation, but showing the nut lock jammed against the nut sufficiently to throw the nut lock into locking engagement with the bolt.

Figure III is a top plan view of the nut and bolt as of either Figures I or II detached.

Figure IV is a plan view of my nut lock detached.

Referring to the numerals on the drawing, 1 indicates a cylindrical threaded male member denominated for convenient brevity a bolt which is the concrete form shown in Figure I.

An ordinary nut 2 is shown as applied to the bolt. The bolt is shown in Figure I as securing together, between its head 3 and the nut 2 two objects or plates 5 and 6, that are suitably apertured to receive it. In Figure II, only the plate 5 is shown, as affording sufficient illustration in view of Figure I.

The nut is provided, as usual, with a smooth outer face 7, to accommodate operative engagement therewith of my nut lock 8. Said nut lock is made of a comparatively thin sheet of resilient metal, and is slightly dished, as illustrated, for example, in Figures I and II. It is provided with an opening 10, whose diameter corresponds to that of the bottom of threads of the member to which it is applicable, for example, the bolt 1. On one side, the opening 10 which were otherwise circular in shape, is preferably amplified on one side by a shallow recess 11, let into the body of the metal sheet of which the nut lock is made, as specified.

The nut lock may be screwed into the thread of the bolt 1, as shown in Figure I, and then when it comes in contact with the nut 2, as shown in Figure II, it will, by reason of the dish shape and resiliency of the sheet of which the nut lock is made, under continued screw pressure against the face 7 of the nut which tends to flatten said sheet, cause the edges of the opening 10 to engage the thread of the bolt. The presence of the recess 11 will cause the edges of the opening 10 slightly to twist and thereby to amplify the locking effect through engagement of the opposite faces of a thread section as indicated by the numeral 12 in Figure II. Continued rotation of the nut lock tending to drive it toward the nut 2, will increase the flattening upon it, with the further effect of causing the edges of the opening 10 to positively and firmly engage the threads of the bolt or the opposite sides of the thread, exemplified at 12, if the opening 10 be amplified, as preferred, by presence of the recess 11.

By the means just described a secure locking effect upon the nut lock and through it of the nut 2 is accomplished. That effect is derived from the resiliency and stiffness of the sheet of which the nut lock is made, and is, therefore, of a nature to admit of the positive unscrewing of the nut lock at the will of an operator, whereby the nut lock may be applied and removed at any time when desired. So long as the nut lock is in place, neither end thrust of the nut 2 against it, nor application of ordinary force to the nut to turn it upon the bolt 1, will serve to release the nut.

The mode of operation of my device is fully explained in the foregoing specification.

What I claim is:

A nut-lock made of a dish-shaped sheet of resilient metal, having a circular opening to fit the bottom of the threads of a male member provided for it, said opening being amplified on one side by a recess so that when the nut lock is applied on a nut the dish-shaped sheet will be flattened and cause the edges of said opening to twist with a locking effect upon said male member.

In testimony whereof, I have hereunto set my hand in the presence of two subscribing witnesses.

EDWIN E. THOMAS.

Witnesses:
  LEICESTER B. ATKINS,
  SARAH Z. RILEA.